US009130983B2

(12) United States Patent
Heo et al.

(10) Patent No.: US 9,130,983 B2
(45) Date of Patent: Sep. 8, 2015

(54) APPARATUS AND METHOD FOR DETECTING ABNORMALITY SIGN IN CONTROL SYSTEM

(71) Applicant: Electronics and Telecommunications Research Institute, Daejeon (KR)

(72) Inventors: Youngjun Heo, Daejeon (KR); Seon-Gyoung Sohn, Daejeon (KR); Dong Ho Kang, Daejeon (KR); Byoung-Koo Kim, Daejeon (KR); Jung-Chan Na, Daejeon (KR); Ik Kyun Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 122 days.

(21) Appl. No.: 13/927,794

(22) Filed: Jun. 26, 2013

(65) Prior Publication Data

US 2014/0298399 A1  Oct. 2, 2014

(30) Foreign Application Priority Data

Mar. 29, 2013  (KR) ........................ 10-2013-0034526

(51) Int. Cl.
*G06F 17/00* (2006.01)
*H04L 29/06* (2006.01)
(52) U.S. Cl.
CPC .................................. *H04L 63/1416* (2013.01)
(58) Field of Classification Search
CPC ................................................... H04L 63/1416
See application file for complete search history.

(56) References Cited

U.S. PATENT DOCUMENTS

| 2010/0110932 | A1* | 5/2010 | Doran et al. | 370/254 |
|---|---|---|---|---|
| 2011/0153839 | A1* | 6/2011 | Rajan et al. | 709/227 |
| 2012/0210158 | A1* | 8/2012 | Akiyama et al. | 714/2 |
| 2012/0216243 | A1 | 8/2012 | Gill et al. | |

FOREIGN PATENT DOCUMENTS

| JP | 2012168686 A | 9/2012 |
|---|---|---|
| KR | 101079036 B1 | 10/2011 |
| KR | 1020120074041 A | 7/2012 |
| KR | 1020120079972 A | 7/2012 |

* cited by examiner

*Primary Examiner* — Nirav B Patel
*Assistant Examiner* — Mohammed Waliullah
(74) *Attorney, Agent, or Firm* — William Park & Associates Ltd.

(57) ABSTRACT

An apparatus for detecting an abnormality sign in a control system, the control system comprising control equipments, network equipments, security equipments or server equipments, the apparatus includes an information collection module configured to collect system information, network information, security event information or transaction information in interworking with a control equipments, network equipments, security equipments or server equipments. The apparatus includes storage module that stores the information collected by the information collection module. The apparatus includes an abnormality detection module configured to analyze a correlation between the collected information and a prescribed security policy to detect whether there is an abnormality sign in the control system.

12 Claims, 3 Drawing Sheets

APPARATUS AND METHOD FOR DETECTING ABNORMALITY SIGN IN CONTROL SYSTEM

RELATED APPLICATIONS

This application claims the benefit of Korean Patent Application No. 10-2013-0034526, filed on Mar. 29, 2013, which is hereby incorporated by reference as if fully set forth herein.

FIELD OF THE INVENTION

The present invention relates to a detection of an abnormality sign in a control system, and more particularly, to an apparatus and method for detecting an abnormality sign in a control system, capable of collecting information through the interworking with a plurality of equipments that constitute the control system and detecting the abnormality sign based on a correlation between the collected information and a security policy.

BACKGROUND OF THE INVENTION

Devices such as PLCs (Programmable Logic Controllers), RTUs (Remote Terminal Units), and others, network equipments such as switches, routers, and others, several control facilities such as HMIs (Human Machine Interfaces), server and others are used in order to control and operate industrial facilities. These control facilities and equipments show a tendency to digitize and liberalize.

On the other hand, in recent years, the advanced persistent threat with the aim of industrial control systems has become a serious problem and a large scale of physical disaster by a cyber terrorism is likely to happen.

In addition, operating systems and communication protocols that are used in the industrial control system are tending towards the use of public operating systems and standard protocols, which results in providing an attacker with a lot of information about the behavior of the industrial control systems and networks.

Based on the information, the attacker could infiltrate the industrial control systems, change commands or critical values, illegally harms the equipments, cut transmission lines to cause the industrial control systems to malfunction or disable. Such representative attacks may include a Stuxnet aiming at the industrial facilities.

For the reason as set for the above, in recent years, security products for the protection of the industrial control systems, such as firewalls, intrusion detection systems have been developed and spread widely, and most of these security products are installed on an edge area to an external network to perform a guard security response.

As described above, since the security products perform the guard security response, they are vulnerable issues arisen from internal infrastructures, and an effective response is not conducted in a situation where infiltration paths inclusive of insider threats are more diverse.

SUMMARY OF THE INVENTION

In view of the above, the present invention provides an apparatus and method for protecting control systems from a diversity of cyber threat attacks to cause a malfunction of the control systems and network equipments necessary to control and operate industrial facilities.

In accordance with an exemplary embodiment of the present invention, there is provided an apparatus for detecting an abnormality sign in a control system, the control system comprising control equipments, network equipments, security equipments or server equipments, which includes: an information collection module configured to collect system information, network information, security event information or transaction information in interworking with the control equipments, network equipments, security equipments or server equipments; storage module that stores the information collected by the information collection module; and an abnormality detection module configured to analyze a correlation between the collected information and a prescribed security policy to detect whether there is an abnormality sign in the control system.

In the exemplary embodiment, the system information includes a usage rate of central processing units (CPUs) in the respective equipments in the control system, a state of process activities, a size of files being processed by the respective equipments or an occupancy rate of central processing units of the files in the respective equipments in the control system.

In the exemplary embodiment, the security event information includes a source address of a medium to access any equipment in the control system, a destination address, a source port number or a destination port number.

In the exemplary embodiment, the network information includes an amount of traffics generated from the respective equipments in the control system, the number of transmitted packets, the number of connection requests, the number of simultaneous connection requests, the duration time of network connection or the number of rejected connection requests.

In the exemplary embodiment, the abnormality detection module is configured to analyze the correlation between the collected information and the prescribed security policy based on a policy, profiling or context recognition.

In the exemplary embodiment, the information collection module includes; a system information manager configured to collect the system information from the respective equipments in the control system for the management thereof; a component manager configured to collect information on network nodes and end systems connected to a network in interworking with the respective equipments in the control system and the other end systems which exchange authenticated data for the management thereof; a security event information manager configured to manage a security event information including a connection attempt of unauthorized users, an alarm for an excess of maximum connections, an alarm for an excess of maximum simultaneous connections, an alarm for an excess of minimum idle times or maximum idle times, an alarm for a buffer overflow or a buffer underflow, an alarm for a deformed PDU or a modulated PDU, an alarm for a power loss, an alarm for a power supply, an alarm for a communication media loss, an alarm for communication media connection, an alarm for a door open, an alarm for sensors exceeding the limit value, an alarm for an excess of the largest traffic cycle settings, an alarm for an excess of maximum traffic volume settings, or an alarm to imply that a synchronization is out of the required precision; and a control facility profiling configured to manage information including detection of the connection status or the disconnection status of end systems to a network, detection of status of network nodes that are newly added, or detection of new paths.

In accordance with another aspect of the exemplary embodiment of the present invention, there is provided an method for detecting an abnormality sign in a control system, the control system comprising control equipments, network equipments, security equipments or server equipments, which includes: collecting system information, network information, security event information or transaction information in interworking with the control equipments, network equipments, security equipments or server equipments; deriving, in response to a request to detect the abnormality sign, a correlation between the collected information and a prescribed security policy; and detecting whether there is the abnormality sign based on the derived correlation.

In the exemplary embodiment, the collecting the information includes: collecting the system information including a usage rate of central processing units (CPUs) in the respective equipments in the control system, a state of process activities, a size of files being processed by the respective equipments or an occupancy rate of central processing units of the files in the respective equipments in the control system.

In the exemplary embodiment, the collecting the information includes: collecting the security event information including a source address of a medium to access any equipment in the control system, a destination address, a source port number or a destination port number.

In the exemplary embodiment, the security event information includes a connection attempt of unauthorized users, an alarm for an excess of maximum connections, an alarm for an excess of maximum simultaneous connections, an alarm for an excess of minimum idle times or maximum idle times, an alarm for a buffer overflow or a buffer underflow, an alarm for a deformed PDU or a modulated PDU, an alarm for a power loss, an alarm for a power supply, an alarm for a communication media loss, an alarm for communication media connection, an alarm for a door open, an alarm for sensors exceeding the limit value, an alarm for an excess of the largest traffic cycle settings, an alarm for an excess of maximum traffic volume settings, or an alarm to imply that a synchronization is out of the required precision.

In the exemplary embodiment, collecting the information includes: collecting the network information including an amount of traffics generated from the respective equipments in the control system, the number of transmitted packets, the number of connection requests, the number of simultaneous connection requests, the duration time of network connection or the number of rejected connection requests.

In the exemplary embodiment, the deriving the correlation includes: analyzing the correlation between the collected information and the prescribed security policy based on a policy, profiling, or context recognition to derive the correlation.

As described above, the embodiment of the present invention collects system information, network information, and security event information or transaction information for the management thereof and performs a correlation analysis among the information is performed, thereby recognizing beforehand an occurrence of a security breach of the industrial control systems.

Further, the embodiment of the present invention detects an attack from the outside as well as an occurrence of an inside infiltration to take a rapid response to the outside attack and the inside infiltration, to thereby guarantee the availability of the industrial control systems.

In addition, the embodiment of the invention may detect non-intentional mistakes by a normal operator to cause malfunction of the industrial control systems.

BRIEF DESCRIPTION OF THE DRAWINGS

The above and other objects and features of the present invention will become apparent from the following description of the embodiments given in conjunction with the accompanying drawings, in which.

DETAILED DESCRIPTION OF THE EMBODIMENTS

The advantages and features of exemplary embodiments of the present invention and methods of accomplishing them will be clearly understood from the following description of the embodiments taken in conjunction with the accompanying drawings. However, the present invention is not limited to those embodiments and may be implemented in various forms. It should be noted that the embodiments are provided to make a full disclosure and also to allow those skilled in the art to know the full scope of the present invention. Therefore, the present invention will be defined only by the scope of the appended claims.

In the following description, well-known functions or constitutions will not be described in detail if they would unnecessarily obscure the embodiments of the invention. Further, the terminologies to be described below are defined in consideration of functions in the invention and may vary depending on a user's or operator's intention or practice. Accordingly, the definition may be made on a basis of the content throughout the specification.

Hereinafter, embodiments of the present invention will be described in detail with reference to the accompanying drawings.

Figure 1:
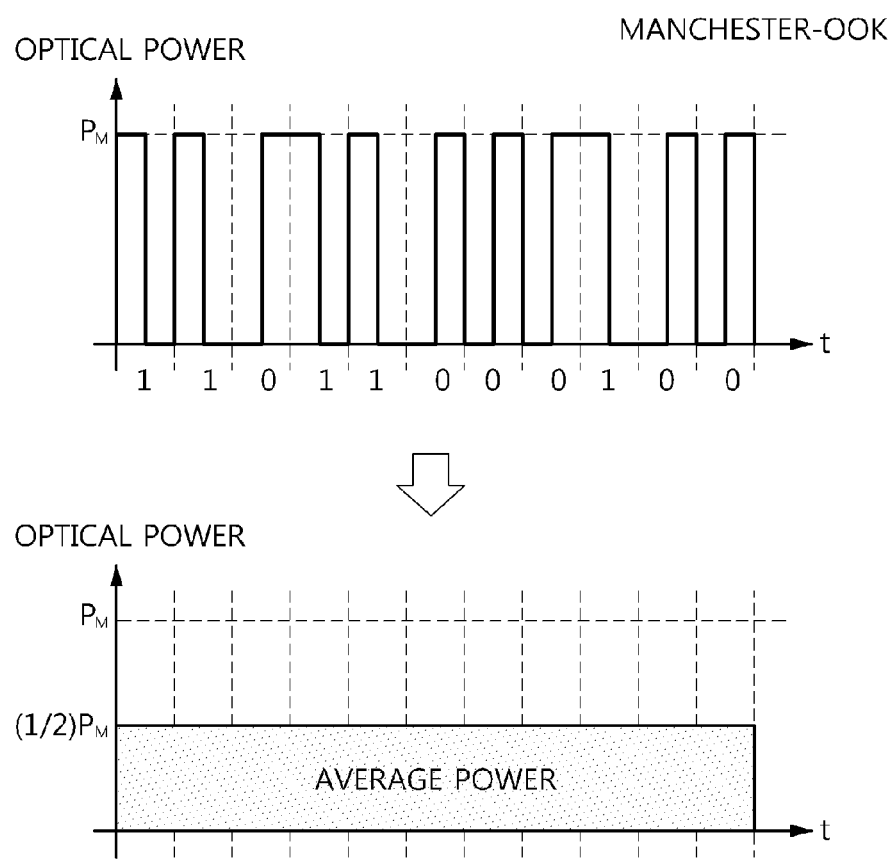
FIG. 1 is a diagram of a network system including an industrial control system to which an embodiment of the present invention is applied and an abnormality detection apparatus in accordance with the embodiment of the present invention.

FIG. 1 is a diagram of a network system including an industrial control system to which an embodiment of the present invention is applied and an abnormality detection apparatus in accordance with the embodiment of the present invention. As illustrated in FIG. 1, the network system generally includes an industrial control system 100 comprised of several types of industrial equipments and an abnormality detection apparatus 200.

The industrial control system 100 may be connected to the abnormality detection apparatus 200 via a communication network.

The industrial control system 100 may include field equipments such as sensors, motors and others, control equipments such as PLCs (Programmable Logic Controllers), DCSs (Distributed Control Systems), RTUs (Remote Terminal Units) and others, data storage equipment used to save information that is collected, network equipments such as switches used to connect a large number of equipments, security equipments used to perform security checks such as SCADA firewalls and others, a variety of servers and HMI (Human Machine Interface), and the like. Here, a data storage equipment may be implemented in the form of a server.

Each of the network equipments may include a variety of devices such as core routers, inner routers switches and the like. This network equipment may collect and manage information such as a total elapsed time since a last reset, a total number of failed connection attempts after a reset, an entire time that a connection is maintained after a reset, a total elapsed time that a last connection is maintained since the last connection has been established, an average connection time, the number of denied connections, IDs of failed connections, the number of reset attempts and connection time therefor, an average message delivery time, a minimum message transmission time, a maximum message transmission time, the number of messages, an average message size in bytes, a minimum message size in bytes, a maximum message size in bytes, a link's list that is licensed from network devices, a link's list available from network devices, statistics of reset message transmission time, statistics of reset message size in bytes.

Each of the control equipments may collect and manage information such as a state of applications or software modules, the number of starts or resets of applications, an input data state of applications or software modules, a status of network connections, a state of end devices, a state for backup, devices, system and applications including availability, the number of unauthorized data access attempts, an event number of lost data, the number of starts or resets of control equipments, and the like.

Each of the security equipments may collect and manage information such as the number that exceeds maximum connections, the number that exceeds maximum simultaneous connections, an actual amount of idle times, the number of buffer overruns, the number of buffer underruns, user IDs that cause buffer-related issues, the number of deformed PDUs (Protocol Description units), the number of forged PDUs, user IDs that cause PDU-related issues, the number of power losses, an alarm of telecommunication media losses, traffic cycle, traffic volume, system IDs that are deviated from the time synchronization accuracy, information on attack type and the like.

Each of the servers and HMI equipments may collect and manage information such as IDs of unauthorized users, the number of unauthorized connection attempts, and rates of unauthorized connection attempts, and the like.

Meanwhile, these equipments in the industrial control system 100 transfer the management information to the abnormality detection apparatus 200. The abnormality detection apparatus 200 collects the management information and detects an abnormality sign in the industrial control system 100 based on the collected management information and a prescribed security policy. A detailed description thereof will be made with reference to FIGS. 2 and 3.

Figure 2:
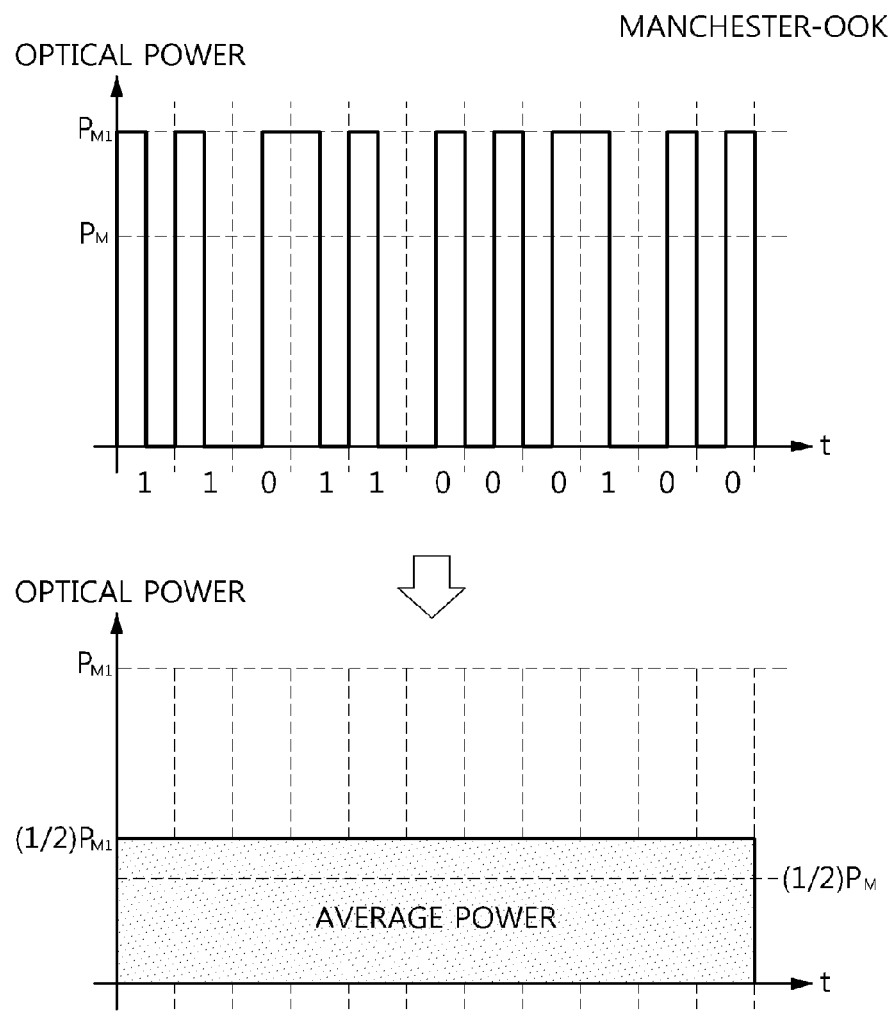
FIG. 2 is a detailed block diagram of the abnormality detection apparatus shown in FIG. 1 in accordance with an exemplary embodiment of the present invention.

FIG. 2 is a detailed block diagram of the abnormality detection apparatus 200.

As shown in FIG. 2, the industrial control system 100 includes an information collection module 210, a storage module 220, a security policy database the security policy DB 230, and an abnormality detection module 240.

The management information collected by the abnormality detection apparatus 200 may generally include system state information, network information and security event information or transaction information.

The system state information may include a usage rate of central processing units (CPUs), a usage rate of memories, state of process activities, a size of files being processed by the respective equipments or an occupancy rate of central processing units of the files in the respective equipments in the control system, and so on.

The network information may include an amount of traffics (bps), the number of transmitted packets (pps), number of connection requests, the number of simultaneous connection requests, duration of connections, the number of rejected connection requests.

The security event information may include a source address, destination address, source port number, destination port number.

The information collection module 210 in the abnormality detection apparatus 200 includes a system information manager 212, a component manager 214, a security event information manager 216 and a control facility profiling 218.

The system information manager 212 receives and manages the system state information from the control equipments such as PLC, RTU, DCS and so on and working terminals in the industrial control system.

The component manager 214 may collect and manage information such as a list of end systems that are connected to a network of the industrial control system 100, a list of network nodes, a list of paths within the network, a setting of access control lists depending on object identifiers, a list of paths of end systems or a list of routing priorities, settled working phases such as switch backup commands at the time of equipment failures, an elapsed time taken to distinguish from a temporary connection failure to a permanent connection fail, the number of retry attempts, an elapsed time to retry attempts after a temporary connection failure, the number of retry attempts after a permanent connection failure, an elapsed time to retry attempts after a permanent connection failure, protocol identifiers, protocol versions, percentage of resource usage causing a resource depletion alarm, end system object identifiers, a network connection list for end systems, the other end systems which exchange authenticated data, the other roles of systems.

The security event information manager 216 may receive and manage a variety of security event information in interworking with firewalls. More specifically, the security event information manager 216 may manage the security event information such as a connection attempt of unauthorized users, an alarm for an excess of maximum connections, an alarm for an excess of maximum simultaneous connections, an alarm for an excess of minimum idle times, an alarm for an excess of maximum idle times, an alarm for a buffer overflow, an alarm for a buffer underflow, an alarm for a deformed PDU, an alarm for a modulated PDU, an alarm for a power loss, an alarm for a power supply, an alarm for a communication media loss, an alarm for communication media connection, an alarm for a door open, an alarm for sensors exceeding the limit value, an alarm for an excess of the largest traffic cycle settings, an alarm for an excess of maximum traffic volume settings, an alarm to imply that a synchronization is out of the required precision, etc.

The control facility profiling 218 may collect and manage information such as detection of the connection status or the disconnection status of end systems to a network, detection of status of network nodes that are newly added, detection of new paths, etc.

The information collected from the system information manager 212, the component manager 214, the security event information manager 216, and the control facility profiling 218 are classified by the information collection module 210 and then stored in the storage module 220. In other words, the information collection module 210 classifies the information that is collected in interworking with the respective equipments in the industrial control system 100 in line with a prescribed criterion and stores the classified information in respective databases (DBs) in the storage module 220.

The storage module 220 may be implemented in the form of servers and includes a security event DB 221, a control facility state DB 222, a traffic information DB 223, a transaction information DB 224, and a system and network construction DB 225.

The security policy DB 230 stores a security policy including a list of authorized users, a list of permissions, a maximum number of connections that can accept, an actual number of physical connections that can accept actually, settings of a maximum traffic cycle, settings of a maximum traffic volume, an accuracy of system synchronization, the time considered that the system has been adjusted from the outside, the number of attacks considered that the system has been adjusted from the outside.

The abnormality detection module 240 performs a correlation analysis between the respective information stored in the storage module 220 and the security policy stored in the security policy DB 230 and detects the abnormality sign based on the analyzed result. A correlation analysis method for analyzing the security policy and the collected information may include a policy-based analysis method, a profiling-based analysis method, or a context recognition-based analysis method, but it is not limited thereto.

An operation performed by the abnormality detection apparatus 200 will be explained in detail with reference to FIG. 3.

Figure 3:
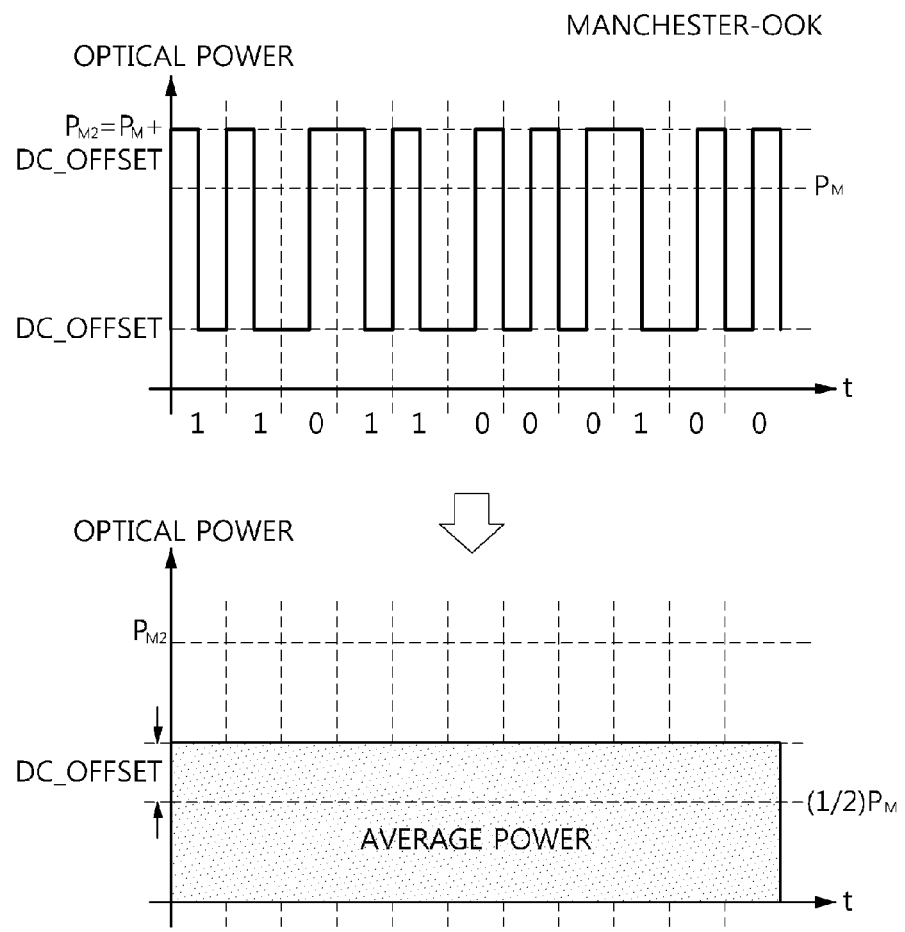
FIG. 3 is a flow chart illustrating a process for detecting an abnormality significant from the industrial control systems in interworking with the abnormality detection apparatus.

FIG. 3 is a flow chart illustrating a process for detecting an abnormality sign of the abnormality detection apparatus 200 in interworking with the industrial control system 100 in accordance with an exemplary embodiment of the present invention.

As shown in FIG. 3, the information collection module 210 in the abnormality detection apparatus 200 collects the information through the system information manager 212, the component manager 214, the security event information manager 216, and the control facility profiling 218, for example, the system information, network information, security event information in operation 302 and stores the collected information in the respective DBs in the storage module 220 in operation 304.

Thereafter, in operation 306, the abnormality detection module 240 determines whether there is a request to detect an abnormality sign. As a result of the determination in operation 306, it is determined that there is the detection request, the process goes to operation 308 where the abnormality detection module 240 derives the correlation between the security policy stored in the security policy DB 230 and information stored in the storage module 220. In this regard, a method for deriving the correlation may include a profiling-based analysis method, a context recognition-based analysis method and others.

Sequentially, in operation 310, the abnormality detection module 240 detects the abnormality sign based on the correlation.

As described above, the abnormality detection apparatus 200 collects the information about the industrial control system 100, the network information and the security event information for the management thereof and analyzes the correlation between the information, thereby recognizing beforehand an occurrence of the security breach.

The combinations of the each block of the block diagram and each operation of the flow chart may be performed by computer program instructions. Because the computer program instructions may be loaded on a general purpose computer, a special purpose computer, or a processor of a programmable data processing equipment, the instructions performed through the computer or the processor of the programmable data processing equipment may generate the means performing functions described in the each block of the block diagram and each operation of the flow chart. Because the computer program instructions may be stored in a computer usable memory or computer readable memory which is capable of intending to a computer or other programmable data processing equipment in order to embody a function in a specific way, the instructions stored in the computer usable memory or computer readable memory may produce a manufactured item involving the instruction means performing functions described in the each block of the block diagram and each operation of the flow chart. Because the computer program instructions may be loaded on the computer or other programmable data processing equipment, the instructions performed by the computer or programmable data processing equipment may provide the operations for executing the functions described in the each block of the block diagram and each operation of the flow chart by a series of functional operations being performed on the computer or programmable data processing equipment, thereby a process executed by a computer being generated.

Moreover, the respective blocks or the respective operations may indicate modules, segments, or some of codes including at least one executable instruction for executing a specific logical function(s). In several alternative embodiments, it is noticed that the functions described in the blocks or the sequences may run out of order. For example, two successive blocks and sequences may be substantially executed simultaneously or often in reverse order according to corresponding functions.

The explanation as set forth above is merely described a technical idea of the exemplary embodiments of the present invention, and it will be understood by those skilled in the art to which this invention belongs that various changes and modifications may be made without departing from the scope of essential characteristics of the embodiments of the present invention. Therefore, the exemplary embodiments disclosed herein are not used to limit the technical idea of the present invention, but to explain the present invention, and the scope of the technical idea of the present invention is not limited to these embodiments. Accordingly, the scope of protection of the present invention should be construed as defined in the following claims and changes, modifications and equivalents that fall within the technical idea of the present invention are intended to be embraced by the scope of the claims of the present invention.

What is claimed is:

1. An apparatus for detecting an abnormality sign in a control system, the control system comprising control equipments, network equipments, security equipments or server equipment & the apparatus comprising:
   an information collection module configured to collect system information, network information, security event information or transaction information in interworking with the control equipments, network equipments, security equipments or server equipments;
   a storage module that stores the information collected by the information collection module;
   an abnormality detection module configured to analyze a correlation between the collected information and a prescribed security policy to detect whether there is an abnormality sign in the control system;
   the information collection module including:
      a system information manager configured to collect the system information from the respective equipments in the control system for the management thereof;
      a component manager, configured to collect information on network nodes and end systems connected to a network in interworking with the respective equipments in the control system and the other end systems which exchange authenticated data for the management thereof;
      a security event information manager configured to collect the security event information for the management thereof;

the security event information manager being further configured to manage a the security event information including a connection attempt of unauthorized users, an alarm for an excess of maximum connections, an alarm for an excess of maximum simultaneous connections, an alarm for an excess of minimum idle times or maximum idle times, an alarm for a buffer overflow or a buffer underflow, an alarm for a deformed Protocol Description Unit (PDU) or a modulated PDU; and a control facility configured to collect and manage information including, detection of the connection status or the disconnection status of end system to a network, detection of status of network nodes that are newly added, or detection of new paths.

2. The apparatus of claim 1, wherein the system information comprises a usage rate of central processing units (CPUs) in the respective equipments in the control system, a state of process activities, a size of foes being processed by the respective equipments or an occupancy rate of central processing units of the files in the respective equipments in the control system.

3. The apparatus of claim 1, wherein the security event information comprises a source address of a medium to access any equipment in the control system, a destination address, a source port number or a destination port number.

4. The apparatus of claim 1, wherein the network information comprises an amount of traffic generated from the respective equipments in the control system, the number of transmitted packets, the number of connection requests, the number of simultaneous connection requests, the duration time of network connection or the number of rejected connection requests.

5. The apparatus of claim 1, wherein the abnormality detection module is configured to analyze the correlation between the collected information and the prescribed security policy based on a policy, profiling or context recognition.

6. The apparatus of claim 1, further comprising:
the security event information manager being further configured to manage the security event information including an alarm for a power loss, an alarm for a power supply, an alarm for a communication media loss, an alarm for communication media connection, an alarm for a door open, an alarm for sensors exceeding the limit value, an alarm for an excess of the largest traffic cycle settings, an alarm for an excess of maximum traffic volume settings, or an alarm to imply that a synchronization is out of the required precision.

7. A method for detecting an abnormality sign in a control system, the control system comprising control equipments, network equipments, security equipments or server equipments, the method comprising:
collecting system information, network information, security event information or transaction information in interworking with the control equipments, network equipments, security equipments or server equipments;
deriving, in response to a request to detect the abnormality sign, a correlation between the collected information and a prescribed security policy;
detecting whether there is the abnormality sign based on the derived correlation;
wherein the collecting further includes:

collecting system information from the respective equipments in the control system for the management thereof;
collecting, information on network nodes and end systems connected to a network in interworking with the respective equipments in the control system and the other end systems which exchange authenticated data for the management thereof;
collecting the security event information for the management thereof;
wherein the security event information comprises a connection attempt of unauthorized users, an alarm for an excess of maximum connections, an alarm for an excess of maximum simultaneous connections, an alarm for an excess of minimum idfe times or maximum idle times, an alarm for a buffer overflow or a buffer underflow, an alarm for a deformed P-DU Protocol Description Unit (PDU) or a modulated PDU; and
collecting information including detection of the connection status or the disconnection status of end systems to a network, detection of status of network nodes that are newly added or detection of new paths, for the management thereof.

8. The method of claim 7, wherein said collecting the information comprises:
collecting the system information including a usage rate of central processing units (CPUs) in the respective equipments in the control system, a state of process activities, a size of files being processed by the respective equipments or an occupancy rate of central processing units of the files in the respective equipments in the control system.

9. The method of claim 7, wherein said collecting the information comprises:
collecting the security event information including a source address of a medium to access any equipment in the control system, a destination address, a source port number or a destination port number.

10. The method of claim 7, wherein the security event information further comprises an alarm for a power loss, an alarm for a power supply, an alarm for a communication media loss, an alarm for communication media connection, an alarm for a door open, an alarm for sensors exceeding the limit value, an alarm for an excess of the largest traffic cycle settings, an alarm for an excess of maximum traffic volume settings, or an alarm to imply that a synchronization is out of the required precision.

11. The method of claim 7, wherein said collecting the information comprises:
collecting the network information including an amount of traffic generated from the respective equipments in the control system, the number of transmitted packets, the number of connection requests, the number of simultaneous connection requests, the duration time of network connection or the number of rejected connection requests.

12. The method of claim 7, wherein said deriving the correlation comprises:
analyzing the correlation between the collected information and the prescribed security policy based on a policy, profiling, or context recognition to derive the correlation.

* * * * *